June 11, 1929.  L. B. WILLIAMS  1,716,938
HEADLIGHT
Filed Sept. 15, 1926  2 Sheets-Sheet 1

Lee Barton Williams
Inventor
By C.A. Snow & Co.
Attorneys

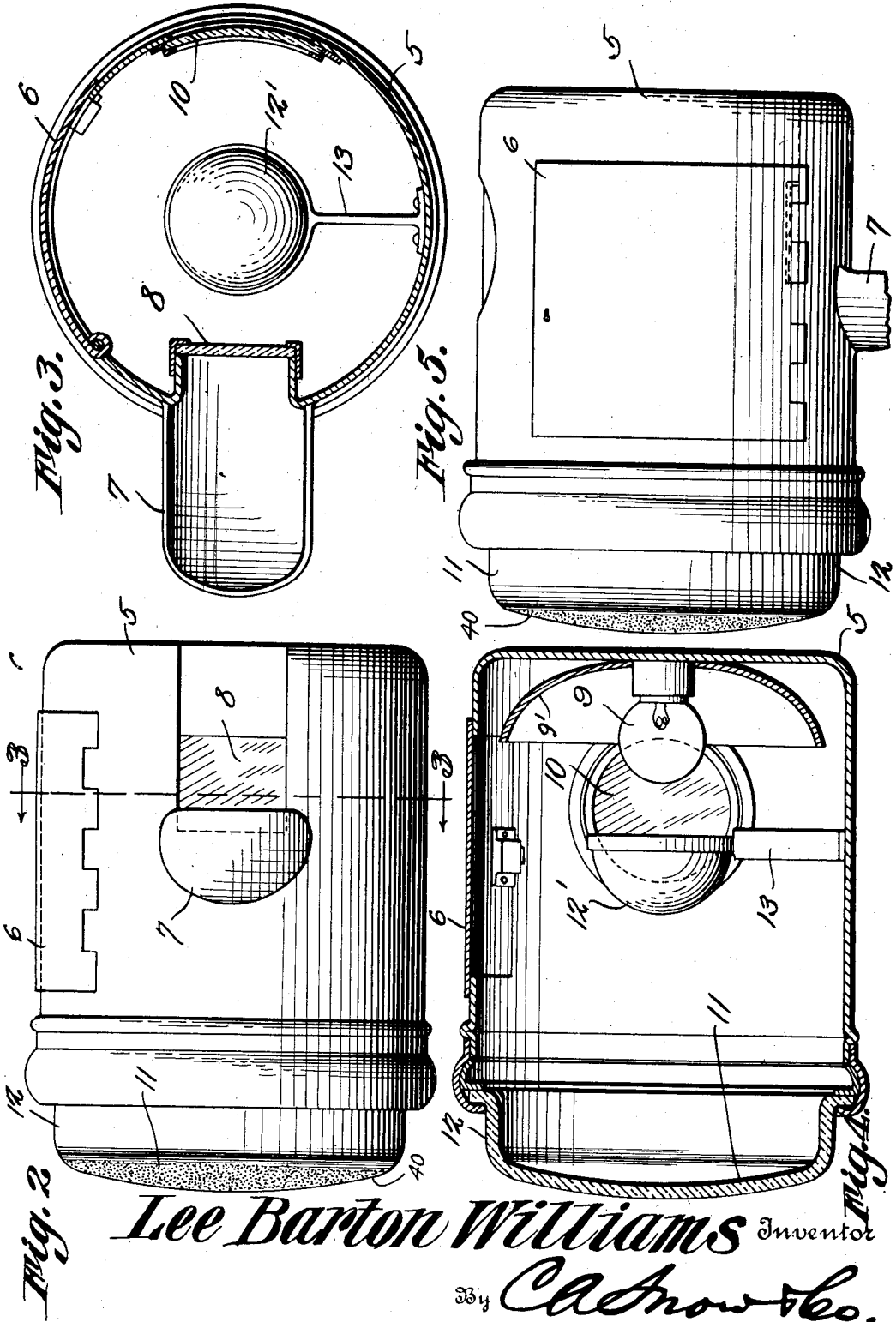

Patented June 11, 1929.

1,716,938

UNITED STATES PATENT OFFICE.

LEE BARTON WILLIAMS, OF PITTSBURGH, PENNSYLVANIA.

HEADLIGHT.

Application filed September 15, 1926. Serial No. 135,591.

This invention relates to headlights for motor vehicles and aims to provide a novel form of headlight which will illuminate the road surface at the rear of the motor vehicle equipped with the light, as well as the sides of the road and front of the vehicle.

Another object of the invention is to provide a headlight of this character which will supply sufficient light to illuminate house numbers along the street or road over which the vehicle is passing.

Another important object of the invention is to provide a headlight wherein the lens is so constructed that the glare of the headlight will be eliminated, but at the same time light rays will be projected from the headlight to adequately illuminate the road surface over which the vehicle is passing.

A still further object of the invention is to provide a headlight wherein access may be had to the interior of the headlight casing through a hinged closure located in the upper portion of the headlight, thereby eliminating the necessity of removing the lens, which is customary in the usual headlight construction.

A further object of the invention is to provide headlights which will illuminate the entire front of the vehicle equipped therewith, so that the license tag at the front of the vehicle and general outline of the vehicle, may be readily observed.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a side elevational view of the headlight.

Figure 3 is a sectional view taken on line 3—3 of Figure 2.

Figure 4 is a vertical sectional view through a headlight.

Figure 5 is a plan view thereof.

Figure 1:
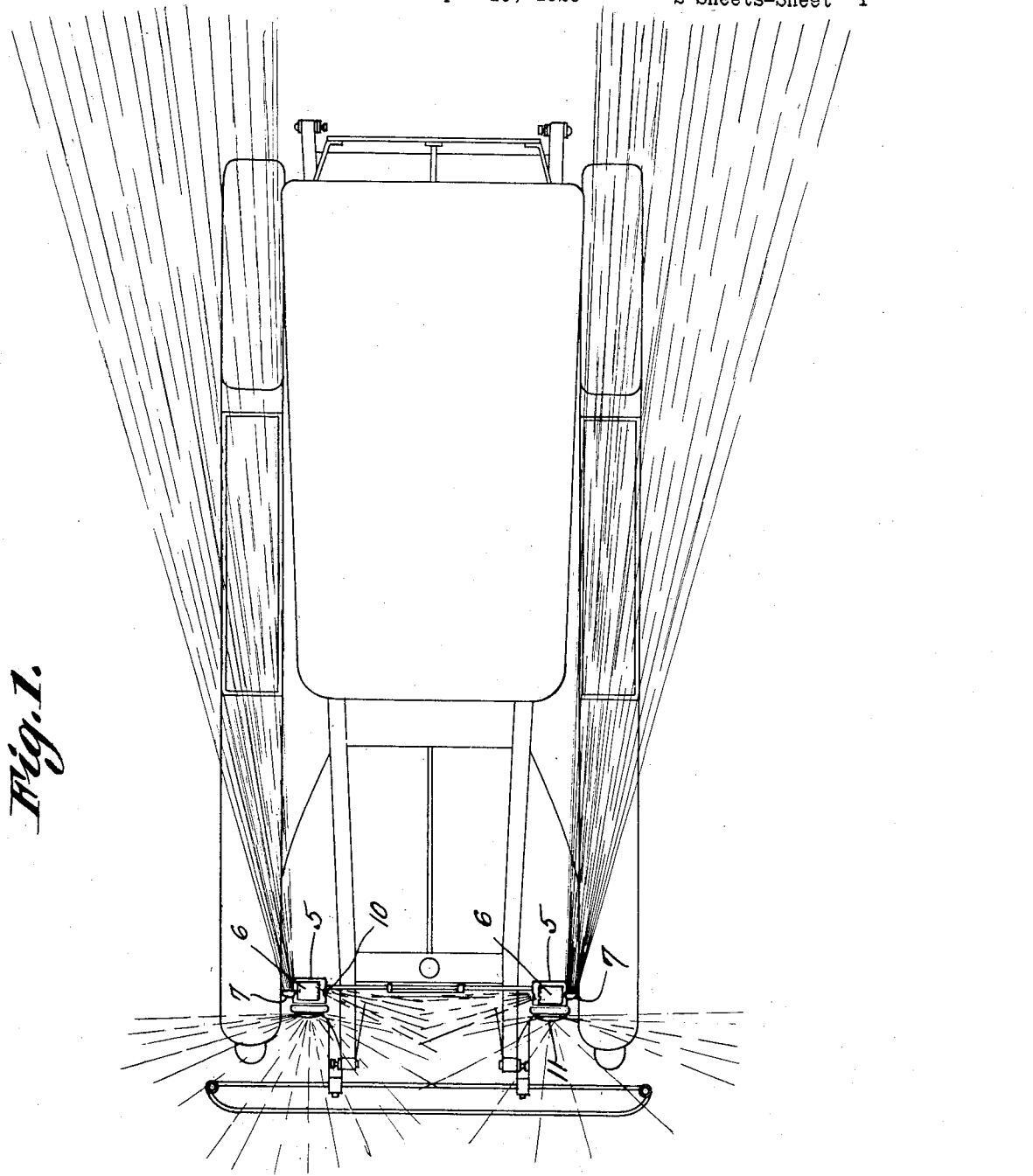
Figure 1 is a plan view illustrating a motor vehicle equipped with headlights constructed in accordance with the invention.

Referring to the drawings in detail, the headlight forming the essence of the present invention includes a body portion 5 which may be of any suitable design and embodies an opening in the upper surface thereof, the opening being normally closed by means of the hinged closure 6 so that easy access to the interior of the casing may be had to facilitate repairing or replacement of the bulb.

Formed in the outer surface of the headlight is a depressed portion extending from a point substantially intermediate the length of the casing to the rear thereof, the depressed portion providing a passageway for the light rays projected rearwardly so that they will pass to the rear of the vehicle unobstructed.

In order that the light rays will be projected rearwardly, an outwardly extended curved deflector 7 is provided adjacent to the recess portion, it being understood that a portion of the recessed portion is cut away providing communication between the interior of the casing and atmosphere. A lens indicated at 8 closes the cut out portion and allows light rays from the lamp positioned within the casing and indicated by the reference character 9 to pass to the reflector.

The inner side wall of the casing is also formed with a cut out portion closed by the lens 10, which permits light rays from the lamp 9 to pass inwardly illuminating the license plate and general outline of the vehicle equipped with the light.

Behind the lamp 9 is positioned a reflector 9' that acts to reflect the light rays towards the front of the casing.

Secured to the forward portion of the casing is the headlight lens 11 which is bulged outwardly providing side faces 12 that permit the light rays to pass laterally so that the sides of the road will be illuminated, and it is contemplated to provide a lamp sufficiently strong to illuminate house numbers along the street or road over which the vehicle is passing.

It might be further stated that this lens 11 is coated with a suitable light diffusing material as at 40 to the end that direct light rays which cause glare, will be eliminated, but the road surface or path of travel of the vehicle will be illuminated to such an extent as to insure safe driving.

In order to intensify the light rays to cause the light rays to be projected through the lens 11 to properly illuminate the road surface, a magnifying lens or bull's eye 12 is provided within the casing, the same being arranged in close proximity to the lamp 9, but intersecting the path of travel of the light rays passing from the lamp 9. This lens 12 is supported by means of the arm 13 secured within the casing and extending upwardly therefrom.

From the foregoing it will be obvious that due to this construction, light rays from the lamp will be projected laterally striking the reflector 7 which reflects the light rays rearwardly illuminating the road surface at the rear of the vehicle to facilitate backing of the vehicle.

It will also be seen that the road surface at the sides of the vehicle will be illuminated, eliminating any danger of the driver ditching the vehicle on passing the vehicle moving in the opposite direction.

It is also pointed out that due to the construction of the headlights, the light rays will be projected laterally to such an extent that house numbers as well as the license tag number and general outline of the front of the vehicle will be visible at all times.

I claim:

A headlight construction including a body portion having a cut out portion formed in the side thereof and extending from one end of the body to points substantially intermediate the ends of the body, portions of the body adjacent to the cut out portion being extended inwardly defining a lens support, a curved stationary deflector extending laterally from the body portion adjacent to one end of the cut out portion, to deflect light rays rearwardly.

In testimony that I claim the foregoing as my own, I have hereunto affixed my signature.

LEE BARTON WILLIAMS.